Figure 1:
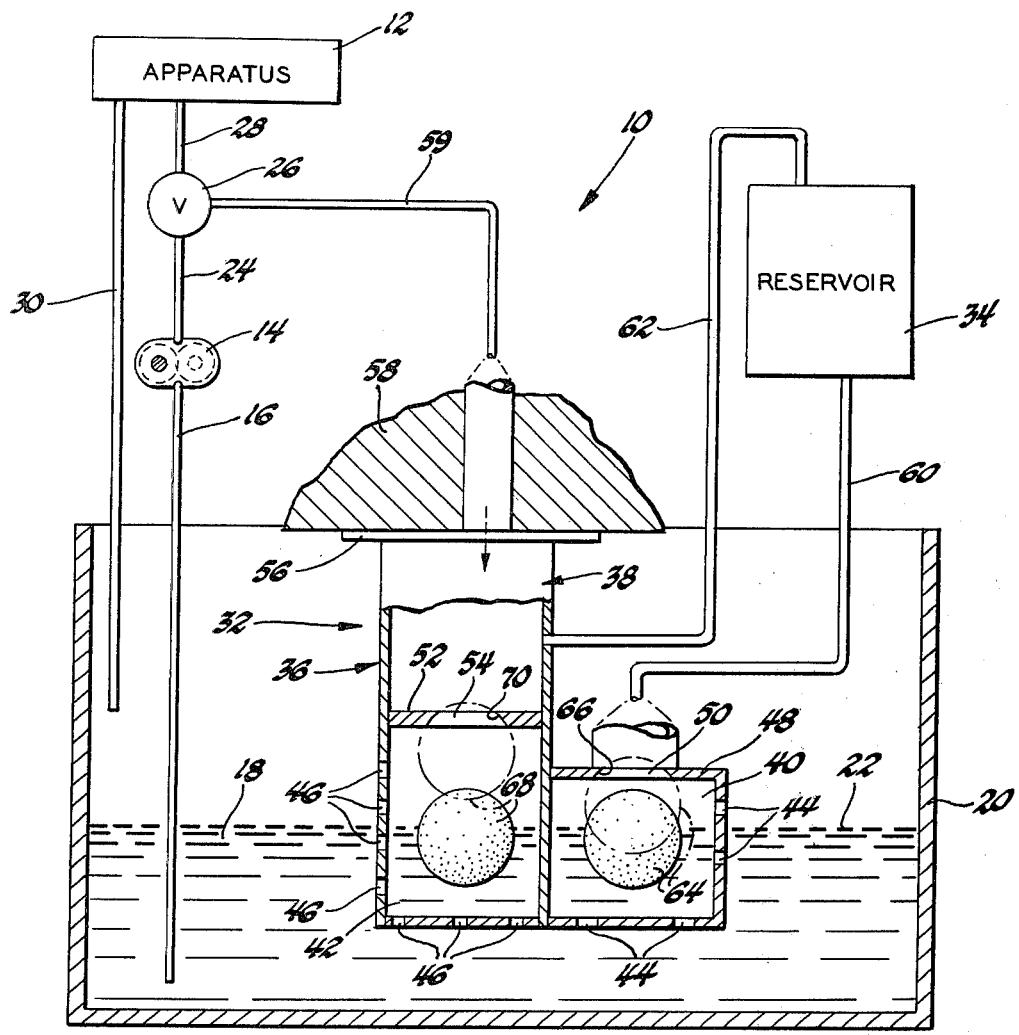

United States Patent [19]
Payne

[11] 4,301,824
[45] Nov. 24, 1981

[54] SUMP LEVEL MAINTENANCE SYSTEM

[75] Inventor: James R. Payne, Speedway, Ind.

[73] Assignee: General Motors Corporation, Detroit, Mich.

[21] Appl. No.: 211,643

[22] Filed: Dec. 1, 1980

[51] Int. Cl.³ .......................................... G05D 11/035
[52] U.S. Cl. .................................. 137/110; 137/115; 137/122; 137/391; 137/423; 137/563
[58] Field of Search ............... 137/110, 115, 120, 121, 137/122, 391, 423, 563; 184/103 A; 222/318; 141/45

[56] References Cited
U.S. PATENT DOCUMENTS

| | | | |
|---|---|---|---|
| 575,172 | 1/1897 | Rousset | 137/122 |
| 2,729,227 | 1/1956 | Hearn | 137/122 |
| 2,792,912 | 5/1957 | Kangas | 184/103 A |
| 2,807,275 | 9/1957 | Steioley | 137/122 |
| 3,743,444 | 7/1973 | Kazama et al. | 137/391 |
| 3,789,865 | 2/1974 | Borman | 137/122 |
| 3,930,423 | 1/1976 | Craig | 74/732 |
| 4,096,879 | 6/1978 | Serur et al. | 137/391 |

FOREIGN PATENT DOCUMENTS 552573  2/1958  Canada .................. 137/391

Primary Examiner—H. Jay Spiegel
Attorney, Agent, or Firm—Saul Schwartz

[57] ABSTRACT

In a fluid circulation system of the type having a pump for supplying pressurized fluid to an apparatus requiring a supply of pressurized fluid, a sump containing a volume of fluid from which the pump draws its supply, and an overage fluid return line, a sump level maintenance system including a remote fluid reservoir disposed above the sump, a housing in communication with the fluid in the sump and defining a pair of ports in communication with respective ones of the reservoir and the overage return passage, a float structure operative to open both ports when the sump level is below a low level and to close the port to the reservoir to prevent replenishment when the sump level is between the low level and a high level and to close both ports when the sump level is above the high level to prevent overage fluid from returning to the sump, and a fluid conduit from the overage passage to the reservoir operative to divert overage to the reservoir when the second port is closed thereby depleting the fluid volume in the reservoir.

3 Claims, 2 Drawing Figures

SUMP LEVEL MAINTENANCE SYSTEM

BACKGROUND OF THE INVENTION

1. Field of the Invention

This invention relates generally to fluid circulation systems and, more particularly, to systems for maintaining a predetermined fluid level in a fluid sump.

2. Description of the Prior Art

A typical fluid circulation system associated with a mechanism requiring a supply of fluid under pressure includes a pump for supplying the pressurized fluid, a sump containing a relatively large volume of fluid from which the pump draws its supply, a regulator for controlling the pressure of the supplied fluid, and an overage passage which returns overage fluid from the regulator to the sump. In such a system it is often desirable to maintain the fluid level in the sump within predetermined limits and, since the fluid requirements of the apparatus may vary with time, the task of maintaining fluid level becomes one of supplying fluid to the circulation system when the sump level is too low and diverting fluid from the circulation system when the sump level is too high. Many fluid level maintenance systems have been proposed, the most pertinent to this invention being those employing a remote reservoir above the sump which drains by gravity when the sump level is too low and is filled by fluid pumped from the sump when the sump level is too high. Such systems, while functional, require relatively expensive valve mechanisms because they fill the reservoir from a relatively high pressure source or, alternatively, involve electrical sensing and actuating components such as sensors and solenoid valves which, again, generate expense. A sump level maintenance system according to this invention represents an advance over these and other heretofore known systems through a new combination of simple and economical components to achieve the sump level maintenance objective.

SUMMARY OF THE INVENTION

The primary feature, then, of this invention is that it provides a novel sump level maintenance system of significant economy and simplicity. Another feature of this invention is that it provides a novel sump level maintenance system wherein fluid from a remote reservoir drains by gravity to replenish the sump volume when the sump level is low and wherein fluid is directed to the reservoir from a fluid overage passage to deplete the sump volume when the sump level is too high. Still another feature of this invention resides in the provision in the novel sump level maintenance system of a housing defining a pair of ports in communication with respective ones of the reservoir and the overage return passage, a float structure operative to open both ports when the sump level is below a low level and to close the port to the reservoir to prevent replenishment when the sump level is between the low level and a high level and to close both ports when the sump level is above the high level to prevent overage fluid from returning to the sump, and a fluid conduit from the overage passage to the reservoir operative to divert overage to the reservoir when the second port is closed thereby depleting the fluid volume in the reservoir. A still further feature of this invention resides in the provision, in one embodiment of the novel sump level maintenance system, of a housing having two chambers open to the sump and a pair of ports at levels corresponding to high and low sump levels, a pair of floats in the chambers adapted to sequentially close and open the ports when the sump level is below low sump level or beneath high and low sump levels or above high sump level, and fluid conduits between the ports and the reservoir permitting the reservoir to drain to the sump and permitting overage fluid to be diverted to the reservoir when the proper ports are open and closed.

Figure 2:
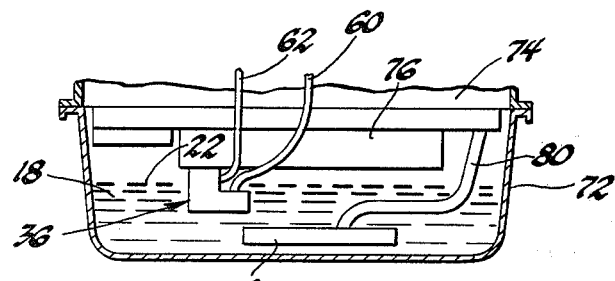

These and other features of this invention will be readily apparent from the following specification and from the drawings wherein:

FIG. 1 is a schematic view of a sump level maintenance system according to this invention; and FIG. 2 is a partially broken away side elevational view of a portion of a sump level maintenance system according to this invention in a vehicle transmission environment.

Referring now to FIG. 1 of the drawings, a fluid circulation system designated generally 10 is provided for supplying fluid under pressure to an apparatus requiring a supply of fluid under pressure and designated generally 12. The apparatus 12 can be any mechanism requiring pressurized fluid, as for example a vehicle automatic transmission having ratio establishing devices actuated by fluid under pressure and a lubrication system requiring a continuous source of pressurized fluid. The circulation system 10 includes a pump 14 having a feed line 16 extending down into a volume of fluid 18 contained in a sump 20. The volume of fluid 18 has an upper surface 22 which defines the level of fluid in the sump, the level rising and falling within limits as described hereinafter. The pump 14 has a discharge line 24 which connects with a pressure regulator valve 26. A supply line 28 extends between the regulator valve 26 and the apparatus 12 to complete the fluid path between the sump and the apparatus so that the pump 14 is operative to supply pressurized fluid to the apparatus. A return line 30 extends between the apparatus 12 and the sump so that spent fluid once used by the apparatus can be returned to the sump for recirculation by the pump 14.

With continued reference to FIG. 1, associated with the fluid circulation system 10 is a sump level maintenance system according to this invention and designated generally 32. The sump level maintenance system 32 includes a fluid reservoir 34 disposed vertically above the sump 20 and a valve assembly 36 adapted to control filling and drainage of the reservoir 34 in accordance with the fluid level in sump 20. The valve 36 includes a housing 38 having a first chamber 40 and a second chamber 42. The housing 38 has a plurality of apertures 44 in the area adjacent the first chamber 40 exposed to the fluid 18 in the sump 20 and permitting unrestricted flow of the fluid into and out of the chamber 40. Similarly, the housing 38 includes a plurality of apertures 46 exposed to the fluid 18 in the sump 20 in the area adjacent the second chamber 42, the apertures 46 thus permitting unrestricted fluid flow into and out of the chamber 42. The upper side of the first chamber 40 is closed by an end wall 48 having a generally circular first port 50 formed therein. The upper end of the second chamber 42 is likewise closed by an end wall 52 having a generally circular second port 54 formed therein. The housing 38 further includes an upper flange 56 adapted for rigid attachment to a suitable base structure 58 such as a control valve body when the apparatus 12 is a vehicle automatic transmission.

Referring again to FIG. 1, the pump 14 supplies the regulator valve 26 with fluid at a pressure in excess of that required by apparatus 12 and at a volume exceeding the demands of apparatus 12. The regulator 26 directs fluid to the apparatus 12 at a preselected pressure and directs the excess fluid or overage to an overage conduit 59 in communication with the interior of housing 38 above second chamber 42. The nature of the overage supply is such that if the overage conduit is blocked, pressure will develop generally up to about regulated pressure if the blockage is complete and maintained. If the overage conduit is left unblocked but diverted vertically, the overage fluid will be pumped vertically up to a maximum height where fluid head balances the regulated pressure. With overage conduit unblocked, however, overage fluid is free to return to the sump 20 by way of the second port 54 and the apertures 46 in the area of second chamber 42. The fluid reservoir 34 is provided with a reservoir drain line 60 extending between the reservoir and the housing 38 at the first port 50. Thus, fluid from the reservoir is free to drain into the sump 20 by way of the drain line 60 and the first port 50. The reservoir 34 is further provided with a reservoir fill line 62 extending between the housing 38 above the end wall 52 and the reservoir, the function of line 62 being more fully described hereinafter.

A first float 64 is confined within the first chamber 40 and floats on the surface 22 of the fluid in the sump. In the embodiment shown, the float 64 is a sphere adapted to engage a complementary spherical seat portion 66 adjacent the first port 50. With the float 64 engaging the seat 66 the first port 50 is effectively sealed to prevent drainage of reservoir 34 through drain line 60. Similarly, a second float 68 floats on the surface 22 of the fluid 18 within the second chamber 42 and is adapted to engage a spherical seat 70 adjacent the second port 54. With the float 68 engaging the seat 70, the overage fluid conduit 59 is redirected from vertically down to the sump through second port 54 to vertically up to the reservoir 34 through the fill line 62, the reservoir being sufficiently low so as not to exceed a fluid head corresponding to regulated pressure.

Describing now the operation of the sump level maintenance system according to this invention, it is first assumed that the fluid requirements of the apparatus 12 are such that the pump 14 may from time to time draw more or less fluid from the sump and, similarly, that the apparatus may from time to time discharge more or less fluid through the return line 30. It is further assumed that a careless operator may overfill the sump inadvertently. Accordingly, it is expected that the level of fluid in the sump as defined by the surface 22 will rise and fall. The reservoir is intended to replenish the volume of fluid in the sump 20 when the level reaches a certain desired low level and conversely, is intended to store fluid diverted from the sump when the level achieves a desired high level. To this end, the first end wall 48 is disposed at a vertical elevation corresponding to the low fluid level such that when the fluid level is at or below the low level first float 64 uncovers spherical seat 66. With seat 66 uncovered, first port 50 is open so that fluid in reservoir 34 is free to drain by way of drain line 60 into the first chamber 40 and thus into the sump 20. At the same time, second float 68, also floating on the fluid surface, is well below the end wall 52 which is disposed at a second vertical elevation corresponding to the high fluid level.

Assuming now that the apparatus 12 discharges an abnormally large amount of fluid into the sump 20 or the sump is overfilled, the level 22 is caused to rise bringing the first float 64 into contact with spherical seat 66 thereby effectively closing the drain 60 from the reservoir so that fluid is no longer permitted to drain back to the sump. Contact between seat 66 and float 64 is depicted by the broken line portion of float 64 in FIG. 1. Second float 68, while also rising with the surface 22, remains below the spherical seat 70 as long as the fluid level remains below the high level. Should inordinate discharge or overfilling of the sump continue, the second float 68 rising with the surface 22 engages the spherical seat 70 at the second port 54 thereby effectively preventing further circulation of the overage fluid from the regulator valve 26 to the sump. Contact between seat 70 and float 68 is depicted by the broken line portion of float 68 in FIG. 1. The regulator valve 26, however, continues to supply overage fluid which is diverted through the reservoir fill line 62 to the reservoir thereby replenishing the fluid supply in the reservoir. The diversion of overage fluid from the fluid circulation system depletes the supply in the reservoir 20 thereby effectively preventing further rise of the level 22 above the desired high level.

Should the situation then reverse and the pump 14 remove an inordinate amount of fluid from the sump 20, the level 22 will descend first opening the second port 54 as the second float 68 drops away from the spherical seat 70 thereby permitting normal recirculation of overage fluid from the regulator valve 26 to the sump. Should the pump continue to draw excess fluid, the fluid level 22 will descend further until first float 64 uncovers spherical seat 66 to permit fluid from reservoir 34 to replenish the sump volume by way of drain line 60 as described hereinabove.

Referring now to FIG. 2, the sump level maintenance system according to this invention is shown in the environment of a vehicle automatic transmission sump, the sump being formed by a transmission oil pan 72 attached to the lower portion of a transmission housing 74. On the under side of the transmission housing 74 within the space enclosed by the oil pan 72 there is bolted or otherwise rigidly attached a hydraulic valve body 76 containing the typical transmission control elements such as the regulator valve 26. An oil intake filter 78 is disposed at the lower end of an oil intake pipe 80 through which fluid is drawn from the sump to the oil pump, not shown. The valve assembly 36 is rigidly attached, within the space enclosed by the oil pan 72, to the lower surface of the valve body 76 thereby projecting down into the volume of fluid 18 normally contained in the fluid sump formed by the oil pan. The reservoir drain line 60 and the reservoir fill line 62 are shown extending from the valve assembly 36 to the remotely located reservoir, not shown.

The embodiments of the invention in which an exclusive property or privilege is claimed are defined as follows:

1. In a fluid circulation system for an apparatus requiring a supply of fluid under pressure, said circulation system including a sump containing a volume of fluid having a surface defining a fluid level in said sump, a pump operative to draw fluid from said sump for supply to said apparatus, and an overage return passage for directing overage fluid from said apparatus to said sump, a fluid level maintenance system comprising a fluid reservoir disposed above said sump, float means in said sump engaging said fluid and movable vertically with said fluid level, means defining a first port means in communication with said reservoir and said sump so that fluid in said reservoir can drain by gravity into said sump, means defining a second port means between said overage passage and said sump so that said overage fluid flows through said second port means before entering said sump, port sealing valve means between said float means and each of said first and said second port means operative to open each of said first and said second port means when said fluid level in said sump is below a low level and to seal said first port means when said fluid level is between said low level and a high level and to seal both of said first and said second port means when said fluid level is above said high level, and passage means between said overage return passage and said reservoir for directing said overage fluid to said reservoir when said second port means is closed.

2. In a fluid circulation system for an apparatus requiring a supply of fluid under pressure, said circulation system including a sump containing a volume of fluid having a surface defining a fluid level in said sump, a pump operative to draw fluid from said sump for supply to said apparatus, and an overage return passage for directing overage fluid from said apparatus to said sump, a fluid level maintenance system comprising a fluid reservoir disposed above said sump, means defining a first port means in communication with said reservoir and said sump so that fluid in said reservoir can drain by gravity into said sump, means defining a second port means between said overage passage and said sump so that said overage fluid flows through said second port means before entering said sump, a first float means in said sump engaging said fluid and movable vertically with said fluid level and operative to open said first port means when said fluid level is below a low level and to close said first port means when said fluid level is above said low level, a second float means in said sump engaging said fluid and movable vertically with said fluid level and operative to open said second port means whenever said fluid level is below a high level above said low level and to close said second port means when said fluid level is above said high level, and passage means between said overage return passage and said reservoir for directing said overage fluid to said reservoir when said second port means is closed.

3. In a fluid circulation system for an apparatus requiring a supply of fluid under pressure, said circulation system including a sump containing a volume of fluid having a surface defining a fluid level in said sump, a pump operative to draw fluid from said sump for supply to said apparatus, and an overage return passage for directing overage fluid from said apparatus to said sump, a fluid level maintenance system comprising a fluid reservoir disposed above said sump, means in said sump defining a first chamber open to said fluid in said sump and having a first port located at a vertical elevation corresponding to a low fluid level in said sump, a first float disposed in said first chamber and engaging said fluid and movable vertically with said fluid level, said first float opening said first port when said fluid level is below said low level and closing said first port when said fluid level is above said low level, first fluid conduit means between said reservoir and said first port permitting fluid to drain by gravity from said reservoir to said sump when said first port is open, means in said sump defining a second chamber open to said fluid in said sump and having a second port located at a vertical elevation corresponding to a high fluid level in said sump above said low fluid level, a second float disposed in said second chamber and engaging said fluid and movable vertically with said fluid level, said second float opening said second port when said fluid level is below said high level and closing said second port when said fluid level is above said high level, means connecting said overage return passage to said second port so that said overage fluid flows through said second port to said sump when said second port is open, and second fluid conduit means disposed between said overage passage and said reservoir for directing overage fluid to said reservoir when said second port is closed.

* * * * *